United States Patent [19]

Debeir

[11] 4,103,813
[45] Aug. 1, 1978

[54] SEALING OF CONTROLLED-ATMOSPHERE CONTAINERS BY MAGNEWELDING

[75] Inventor: René Pierre Debeir, Osmate (Varese), Italy

[73] Assignee: European Atomic Energy Community (Euratom), Luxembourg

[21] Appl. No.: 716,351

[22] Filed: Aug. 20, 1976

[30] Foreign Application Priority Data

Aug. 21, 1975 [LU] Luxembourg .......................... 73231

[51] Int. Cl.² ............................................ B23K 21/00
[52] U.S. Cl. ..................................... 228/2.5; 228/107
[58] Field of Search ................ 228/2.5, 107, 108, 109

[56] References Cited

U.S. PATENT DOCUMENTS

| 3,345,732 | 10/1967 | Brower | 29/421 M |
| 3,543,387 | 12/1970 | Golinelli et al. | 228/109 |
| 3,698,067 | 10/1972 | Feiss | 228/107 |
| 3,708,865 | 1/1973 | Grin et al. | 228/107 X |

Primary Examiner—Donald G. Kelly
Assistant Examiner—K. J. Ramsey
Attorney, Agent, or Firm—Stevens, Davis, Miller & Mosher

[57] ABSTRACT

This invention relates to the closure of conditioned-atmosphere containers by magnewelding by means of an exploding coil. After packing, the containers are temporarily closed by a programming cap of elastic synthetic polymer adapted to fix the essential features of the geometric parameters concerned in the subsequent magnewelding operation.

Specific application to the sealing of nuclear fuel cans.

5 Claims, 4 Drawing Figures

SEALING OF CONTROLLED-ATMOSPHERE CONTAINERS BY MAGNEWELDING

This invention relates to a process for sealing containers, e.g. nuclear fuel cans and irradiation capsules, by magnewelding.

Containers of this kind may contain substances which are radioactive to start with or which become radioactive during irradiation, e.g. in the manufacture of radio-isotopes in nuclear reactors.

The atmosphere inside the containers must be controlled, e.g. as regards the nature of the gases, their purity and their positive or negative pressure. Finally, the containers are exposed to relatively high temperatures within the reactor, and sometimes to the high pressure of the gases liberated by the unclear transmutations.

In these conditions, sealing of the containers gives rise to numerous problems which the prior art has been able to solve only by the application of complex and expensive techniques.

The prior art proposals are generally based on the principle that final sealing of the containers should be carried out in a glovebox or in another confined atmosphere to prevent any pollution by radioactive products and to control the atmosphere inside the containers.

According to another prior-art proposal (U.S. Pat. No. 3 708 865), final closure of the container is carried out by a method based on magnewelding by means of an exploding coil outside the glovebox. For this purpose, the container is first filled with its contents - e.g. fuel - in a glovebox, and is then being provisionally closed by a plug and protected by a flexible plastic bag.

However, this solution is not suitable for every case of a controlled atmosphere inside a container such as may occur in practice.

In the case of an internal positive pressure such as occurs with fuel elements in certain nuclear reactors, e.g. PWR, once the plastic bag has left the glovebox - which is the enclosure for filling up at pressure - it inflates with the risk of bursting. It is also difficult to locate the exploding coil. Since handling operations change the shape and volume of the plastic bag there are exchanges of gas between the interior and exterior of the fuel elements on the one hand, and between the interior and exterior of the bag on the other hand and these exchanges are likely to cause contaminating substances to escape.

In the case of a slight negative pressure such as is found in gloveboxes generally, the plastic bag - which is necessarily of a larger diameter than that of the fuel element can - will crease, so that there is a lack of accuracy in the centring of the exploding coil.

The invention proposes a process and apparatus to obviate the above disadvantages and enable series magnewelding by means of an exploding coil to be carried out at little cost on containers such as nuclear fuel cans and irradiation capsules.

To this end, according to the process of the invention, once the container has been filled in a glovebox or a similar enclosure and provisionally closed by means of a plug which at least partially enters its open end, the said plug and the said end are capped in sealing-tight relationship by a force-fitted elastic cap before magnewelding is carried out in a suitable enclosure. It will be apparent that the cap only has to have sufficient rigidity to avoid the disadvantages of the plastic bag, and this can be achieved by appropriate selection of the material and/or its thickness. When the above parameters cannot be freely chosen, and in the case of a high internal excess pressure, a mechanical clamping device can be used which acts on the end and/or side surfaces of the cap, thus assuring total sealing until magnewelding of the plug.

Preferably, the cap according to the invention is of an insulating plastic, thus doing away with the need for a special insulant between the can and the exploding coil during magnewelding.

Also, in combination with its function as a sealing agent, the cap according to the invention is used as a coil holder and has the advantage of allowing magnewelding to be programmed by controlling most of the parameters concerned.

Those versed in the art will know that it is advantageous to modulate and graduate the force exerted by the explosion of the coil, e.g. in dependence on its distance from the surface of the can, the nature, the shape and thickness of the metals to be joined, and the distance between them. The magnewelding technique is described in greater detail in the publication EUR. 5060e (1972) pp. 332–336 in the article "Magnewelding" by C. Dumont and P. Jehenson.

One or more of the following parametrers can be fixed according to the required weld using a given coil-holder programming cap:

The coil dimensions: i.e. diameter, length, fixed or variable pitch. Diameter and nature of the coil wire.

Geometry of the cap and material, more particularly plastic, from which it is made.

The position and presentation of the coil connection leads or ends.

Positioning of the coil with respect to the can, plug, and any driver (the driver is a very good electrical conductor inserted between the can and the coil when the can material is of high electrical resistivity).

Nature of the plastic (e.g. polyvinyl chloride or nylon).

It is well known that magnewelding is particularly suitable for producing welds in series. To make the process profitable, the process must be automated as far as possible and the advantage of the programming cap will be apparent since most of the important parameters can be fixed generally outside the actual welding line. The only adjustment to be made during welding then relates to the amount of electrical energy to be supplied to the coil in dependence on the other pre-determined parameters.

The usefulness of the cap acting as a coil holder will also be apparent from the following considerations concerning the behavior of an exploding coil. Before the current pulse volatilizes the coil, the latter is biased by magnetic forces which deform it in the direction of reducing its length and increasing the diameter of the turns. The reduction of the length has an adverse effect on good distribution of the magnetic field. In addition, the increase in the diameter, which results in an increase in the distance between the exploding coil and the tube to be driven (or its driver), reduces the coupling and hence the yield of the pulse.

An improvement of several percent in the yield of the electrical pulse in the case of welds made by means of the programming cap may be attributed to two effects which follow and complement one another:

The coil geometry is retained before coil volatilization

The metal making up the coil is confined after the current passing through it has converted the metal to liquid and/or gas.

The programming cap obviously is finally destroyed but the short interval of time during which the integrity of the exploding coil is retained enables the electrical pulse to be used more satisfactorily.

When the containers, e.g. controlled-atmosphere cans, have to be closed, the atmosphere should of course be conditioned before final closure and the gas and/or liquid atmosphere should not be contaminated by the method of closure and its pressure should not be changed during such closure. Generally, the atmosphere conditioning operation is carried out after degassing at high temperature, either by carrying out a series of emptying and filling operations on the container or a continuous scavenging. To enable the magnewelding seal to be produced immediately after the various treatments described, the plug or plugs are advantageously disposed in the container intake and/or discharge spigots prior to the said treatments. The plug should then have a contour which, for example for scavenging purposes, allows communication between the volumes situated upstream and downstream of said plug. In these conditions the programming cap is particularly useful since it enables the orifices of the conditioned container to be closed rapidly in sealing-tight relationship until magnewelding.

The plug used may have various shapes but should satisfy the following requirements:

a. Allow gases to flow during the degassing stage and gases and/or liquids during the filling stage.

b. Be fixed inside the tube so as to occupy a known position and not shift as a result of shocks and not be driven by the gas flow.

c. Have a shape which allows magnewelding to be carried out, e.g. a frusto-conical part.

As already described above, this method enables sealing of the enclosure to be carried out immediately after the different degassing and filling treatments, in a single operation and without the need for any heat treatment which might result in pollution of the internal atmosphere.

Also, the top end of the plug can readily be given a shape such that it results in sectionalizing of the tube at the end of the magnewelding operation, thus facilitating series-production of seals.

The invention will now be illustrated with reference to examples illustrated in the accompanying drawings wherein.

In the Figures, like elements have like reference numbers.

Figure 1:
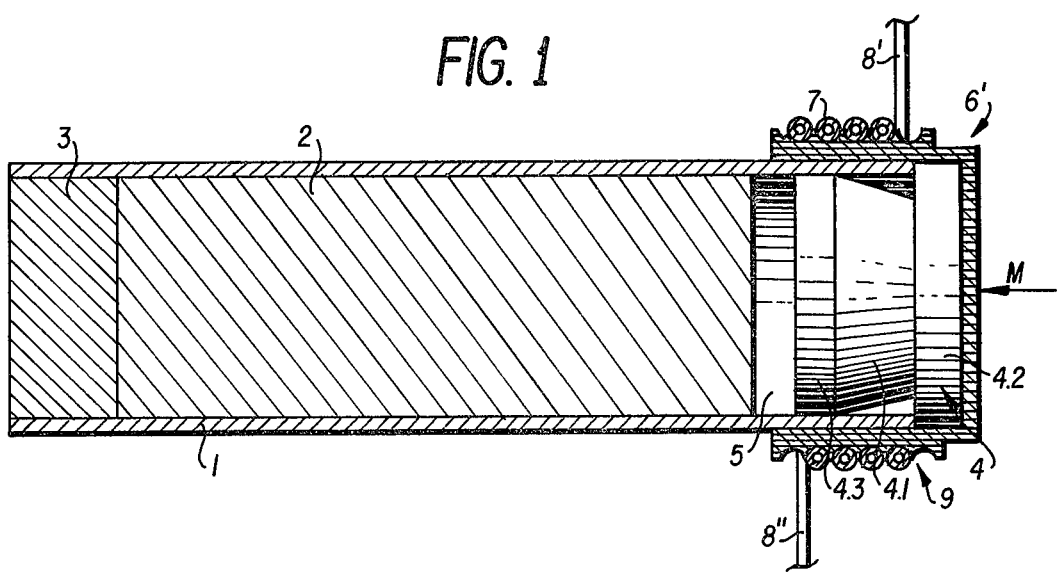
FIG. 1 is an axial section of a tubular can provided with a programming cap at one end.

Referring to FIG. 1, a tubular can 1 contains product 2 for processing in a nuclear reactor. The can is closed at one end 3 by conventional means. At the opposite end, the can is closed by a plug 4 having a frusto-conical part 4.1 and cylindrical portions 4.2 and 4.3 disposed on either side of the frusto-conical part, portion 4.2 emerging from the can. A gaseous atmosphere 5 is formed between the product 2 and the plug 4. The cap 6 bearing the coil 7 with its connections 8' and 8" is force-fitted over the end of the tubular can and the portion 4.2 of the plug projecting therefrom. It will be seen that the turns of the coil are held in grooves 9 formed on the cylindrical surface of the cap. Together with the plug the cap provides temporary sealing of the container when the latter is filled at atmospheric pressure or negative pressure.

If filling is carried out with an internal excess pressure, so that the plug and cap cannot stay in place and provide a seal, a mechanical device denoted by arrow M may be provided to hold the plug and cap assembly during the operations preceding magnewelding.

Frustoconical part 4.1 is provided to facilitate the sealing operation produced by the force applied to the edges, of the container over the plug by the magnetic forces produced between the coil and the can and/or the shockwave produced by the explosion of the coil.

Figure 2:
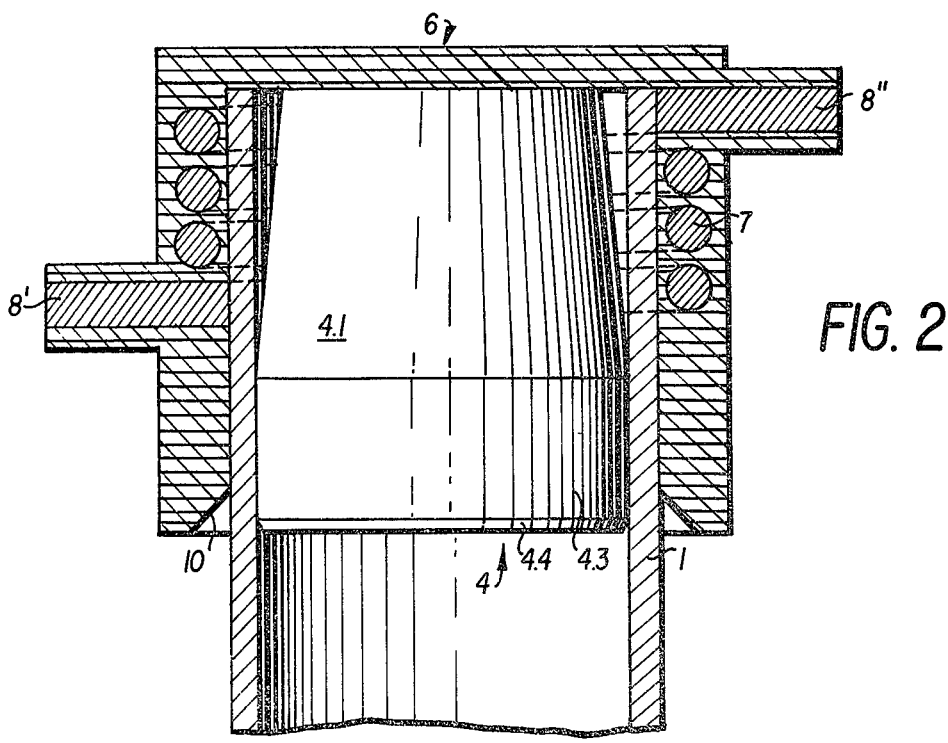
FIG. 2 is also an axial section showing a specific variant embodiment of the cap, the coil wires being embedded in the mass of plastic material forming the cap.

Referring to FIG. 2, which shows a variant of the programming cap according to the invention, the aluminium can 1 is closed by the SAP 7% $Al_2O_3$ cylindrical conical plug 4 formed by a cylindrical element 4.3 which is continued on either side by frusto-conical portions 4.1 and 4.4. A programming cap 6 covers the ends of the can 1 and the plug 4. Embeded in the cap material are the copper windings 7 and connections 8', 8" of the explosive coil. After the ends of the connections 8', 8" have been stripped they are clamped in jaws (not shown) to ensure the passage of the electrical pulse.

In addition to its functions of closing and programming the magnewelding operation, the plastic cap 6 insulates the coil 7 from the metal can 1. In the variant illustrated, it also does away with the need for pre-insulated wire.

Figure 3:
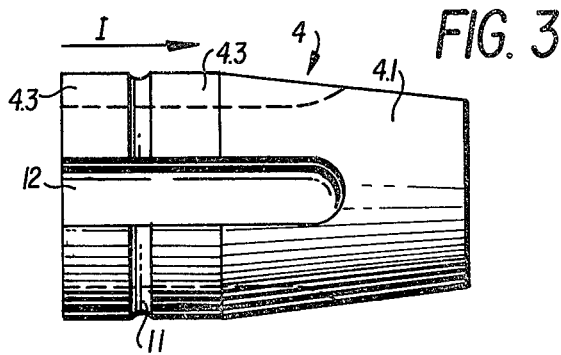
FIG. 3 is a side view of a plug of a type which can be used for closing a controlled-atmosphere enclosure without contamination.
Figure 4:
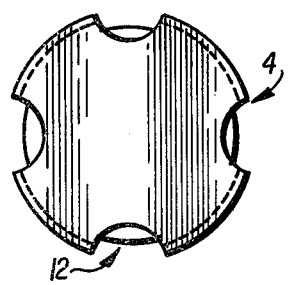
FIG. 4 is a view of the same plug in the direction of arrow I in FIG. 3.

Referring to FIG. 3, the plug 4 has a frusto-conical front part 4.1 and cylindrical portions 4.3 disposed on the same side on the frusto-conical part and separated by a circular groove 11 which serves for provisional fixing of the plug in a tube. The plug 4 has longitudinal grooves 12 formed in the cylindrical parts 4.3 and partially in the frusto-conical element 4.2 to allow communication between the volumes on either side of the plug before final closure by magnewelding, e.g. so that the atmosphere inside a container can be conditioned, the plug 4 then being disposed in an intake or discharge spigot of the container.

EXAMPLE 1

This example relates to the closure of an ECO reactor fuel element, the fuel consisting of $UO_2$ pellets. The can is formed from $A_5NET$ aluminium, with an aluminium content of more than 99.5% Al. The outside/inside diameters of the can are 15/13 mm. The plugs at each end of the can are cylindrical conical made from SAP 7% $Al_2O_3$. The atmosphere is argon at a slight negative pressure, i.e. that of the filling glovebox, i.e. a few cm water. The two plugs are identical and their welding inside the can is carried out in the same way: The first before and the second after filling with the $UO_2$ pellets. Before welding, the first plug is force-fitted inside the can end and then the programming cap is also force-fitted so as to cap the plug and end in sealing-tight relationship. The assembly is then positioned on a rig to provide mechanical support and electrical contact between the coil and the pulse generator (Magneform Model MK 1 - 6 KJ).

The capacitors are then discharged, the coil and the cap explode, but just before then the magnetic forces developed between the coil and the can have projected the end of the latter against the conical part of the plug, thus producing an impact weld.

The can with its end formed by this first welding plug is then introduced into a glovebox in which it is filled with the fuel (UO₂ pellets).

The above-described operations are then repeated on the other end of can, i.e. introduction of the plug, force-fitting of a programming cap, coil holder, and magnewelding.

The following values were selected for the various parameters for the process according to the Example:

1. Energy delivered to the coil; 2 KJ
2. Coil: copper wire, diameter 1.3 mm, 3½ turns, pitch 2 mm
3. Coil-can spacing: 0.2 mm
4. Space between end of can and first turn: 0 mm
5. Postion of plug: small end of cone in same plane as end of can
6. Shape of cap: see FIG. 2
7. Postion of cap: force-fitted until its end contacts the can-plug end
8. Nature of cap: moulded PVC, with coil embedded in the material.

It will be seen that all the magnewelding parameters except for parameters 1 and 5 are governed by the programming cap. Parameter 5, i.e. the position of the plug, does not give rise to any problem, because all that is required is to introduce the plug in the correct direction until it reaches the end of the can.

In a preferential form, the programming cap has notches or projections which, cooperating with one or more sensors, are intended to provide automatic control of the energy delivered by the pulse generator. Each sensor is advantageously disposed on the rig providing the mechanical fixing and electrical contact during magnewelding.

EXAMPLE 2

This example relates to the operations of degassing, filling and sealing a Freon heat tube. After adequate preparation of the inner surface, an aluminium tube is closed by any known means at one end. A plug according to FIG. 3 is introduced at the other end of the tube and provisionally locked by the groove 11 (see FIG. 3). Apparatus for emptying and metered filling of the heat tube with Freon is applied in sealing-tight relationship to the part of the tube projecting from the plug. When the tube has been filled with the required quantity of Freon, the magnewelding coil borne by a programming cap is fitted in register with the zone requiring to be welded and the magnewelding operation is carried out to seal the plug. The tube can then be removed for the external finishing operations.

The sealing described avoids any damage to the inner capillary structure of the heat tube which could be crushed by the prior art clamping method; also, the closure according to the invention will retain a cylindrical or slightly frusto-conical shape without increasing the outer diameter of the tube, the wall of which remains unaltered and has no weakened zone.

I claim:

1. A sealing cap for facilitating the magnewelding of the end of a tubular container by means of an exploding coil, said cap comprising:

a tubular wall structure and an end surface, said tubular wall structure and said end surface being made of elastic material and defining said cap and being adapted to be force-fitted over said end of said tubular container in a tight-sealing relationship therewith;

said tubular wall structure including a plurality of circumferential grooves containing therein windings of said exploding coil, said grooves serving to fix the number of windings surrounding said tubular wall structure, the relative spacing of the windings and the pitch of said windings, said grooves further serving when said cap is force-fitted over said end of said tubular container to fix the location of said windings with respect to said tubular container.

2. A sealing cap as in claim 1 wherein said coil windings are embedded in said tubular wall structure.

3. A sealing cap as in claim 2 wherein said cap has projections adapted to cooperate with sensors for providing control of said magnewelding operation.

4. A sealing cap as in claim 1 wherein said cap has projections adapted to cooperate with sensors for providing control of said magnewelding operation.

5. A sealing cap as in claim 1 wherein said tubular wall structure of said cap is of plastic material.

* * * * *